United States Patent [19]
Murphy

[11] 3,770,299
[45] Nov. 6, 1973

[54] LOCK FOR TRAILER HITCH COUPLER

[75] Inventor: Vincent H. Murphy, Richfield, Minn.

[73] Assignee: Dempco, Inc., Minneapolis, Minn.

[22] Filed: Jan. 24, 1972

[21] Appl. No.: 220,355

[52] U.S. Cl. ............................................... 280/507
[51] Int. Cl. ............................................. B60c 1/06
[58] Field of Search................... 280/507, 511, 512; 70/231

[56] References Cited
UNITED STATES PATENTS

| | | | |
|---|---|---|---|
| 3,492,023 | 1/1970 | Thompson | 280/507 |
| 1,604,690 | 10/1926 | Halaby | 70/231 |

*Primary Examiner*—Robert R. Song
*Attorney*—Ralph L. Dugger et al.

[57] ABSTRACT

A lock for a trailer hitch coupler using a ball coupler assembly. A coupler bolt has a nut for tightening the coupler. The nut includes an outer drive member, and key lock means that is connected between the outer drive portion and an inner portion of the nut so that the outer drive portion may be made to spin free when desired to prevent releasing of the coupler bolt and theft of the trailer when it is either on or off the coupler ball.

16 Claims, 9 Drawing Figures

PATENTED NOV 6 1973 3,770,299

LOCK FOR TRAILER HITCH COUPLER

BACKGROUND OF THE INVENTION

1. Field of the Invention

The present invention relates to trailer coupler locks that can be used for locking a trailer in a manner so that it cannot be easily stolen.

2. Prior Art

In the prior art there are various trailer couplers or hitch locks, for example, U.S. Pat. No. 3,226,133 shows a trailer hitch locking device wherein a false ball is used for locking the coupler. The device is used when the trailer is uncoupled from the vehicle towing the trailer only. Another type of trailer coupler lock is shown in U.S. Pat. No. 2,392,063, which will permit locking when it is attached to the towing vehicle. Still another type of lock for couplers is shown in U.S. Pat. No. 3,567,253.

A device for disabling a trailer hitch is shown in U.S. Pat. No. 3,492,023 which uses a special ball member that fits into the coupler housing when the trailer is not mounted on a towing vehicle.

An additional type safety lock for trailer couplers is shown in U.S. Pat. No. 3,514,980.

The use of a device that has a key lock member that operates between two movable parts of a gas cap is known. For example, U.S. Pat. No. 1,702,205 shows a gas tank cap lock which is of this general construction, and U.S. Pat. Nos. 1,678,174, 1,516,453 and 1,635,228 show theft preventing devices for locking spare tires in place.

U.S. Pat. No. 3,540,245 shows a tamper proof lock nut for mounting wheels onto a car.

SUMMARY OF THE INVENTION

The present invention relates to a trailer hitch lock device which provides a locking member that can be utilized when the trailer is attached to an automobile or when it is unhitched from an automobile. The use of a device that can be locked when it is attached to an automobile is of course of great importance. Snowmobiles or boats are transported extensively on two wheel trailers towed behind automobiles as the use of these items has increased. The number of thefts of these items also has skyrocketed because it is relatively simple to uncouple a trailer, hook it up to another automobile and drive off, not only with the trailer, but also with the more valuable snowmobile or boat.

The present device relates to a quick acting key lock coupler nut that is used, in one position, for tightening or loosening the trailer coupler with respect to a hitch ball, and then in the second position the lock permits the outer portion of the nut to spin free so that the hitch cannot be fastened or unfastened unless the key is used.

The coupler assembly includes means for detenting the inner threaded portion of the nut so that it cannot easily be turned, and therefore will not vibrate loose during use either. The use of the detent also prevents someone from taking the outer portion of the nut, which normally would spin free when locked, and in some way binding the outer portion to the inner portion to permit unthreading the coupler nut.

The locking unit includes spring loaded latch dogs, and when the key is operated the springs will urge the latch dogs outwardly, so that the outer portion of the nut only has to be turned and the dogs will snap into place to form a drive between the inner portions and the outer portions of the unit. This means that it is not necessary to align parts before the key is operated. The key hole can be protected against the elements with suitable covers if desired, and the use of the lock greatly reduces the likelihood of any tampering or theft or a trailer utilizing this lock coupling.

DESCRIPTION OF THE PREFERRED EMBODIMENT

Figure 1:
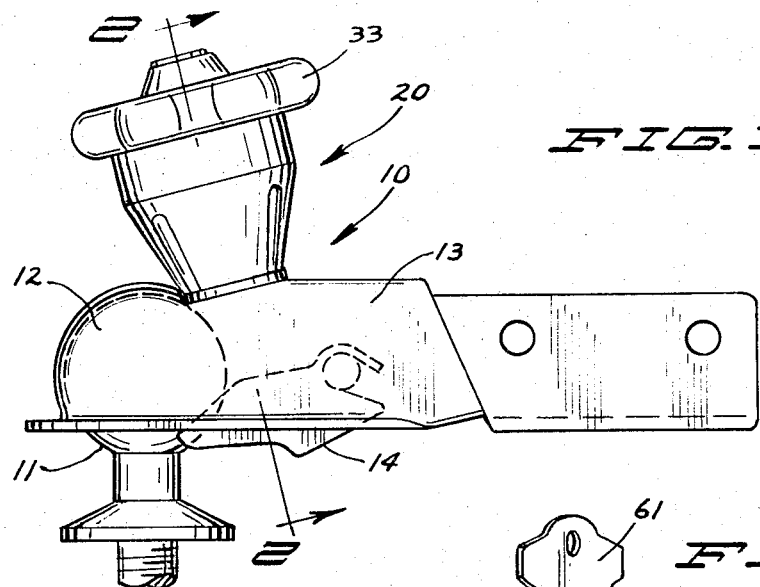
FIG. 1 is a side elevational view of a trailer coupler having a locking nut made according to the present invention installed thereon.

Referring to FIG. 1, a trailer hitch coupler illustrated generally at 10 is of the type used with a hitch ball 11 that in turn is attached to a towing vehicle (not shown). The coupler includes an outer housing 12 that forms the ball socket, and as shown a channel shaped frame portion 13 on which a ball lock lever 14 is mounted. The lock lever is pivotally mounted with a cross pin 15 at the rear thereof, and the front portions of lever 14 are curved to fit underneath the ball 11 and lock the ball into the socket 12. The locking device comprises a headed bolt 16 that extends through a provided opening in the lever 14, and up through the frame portions 13. As shown, a small spring 17 can be provided to urge the lock lever 14 away from ball 11 when the bolt 16 is loosened. With the coupler removed from a hitch ball the lever can be tightened so that the coupler cannot be used without loosening bolt 16.

The lock lever 14 can be locked in position with a key lock coupling nut 20. The coupling nut is formed in two parts and includes a key lock member lockable so that an inner housing of the nut, which actually has the internally threaded opening, will remain stationary with respect to bolt 16 and the outer portion, when it is turned, will spin free. The nut, therefore cannot be loosened when it is locked and thereby theft of the trailer can be prevented because the trailer cannot be removed from a ball 11 to which it is attached, nor can the lever be loosened sufficiently to go onto the ball when bolt 16 is tightened with the coupler off ball 11.

The nut assembly 20 includes an inner housing 21 that has a threaded interior opening 22 which is of size to thread onto the bolt 16 and which will thereby tighten the locking lever 14 in place when the housing 21 is tightened.

Figure 8:
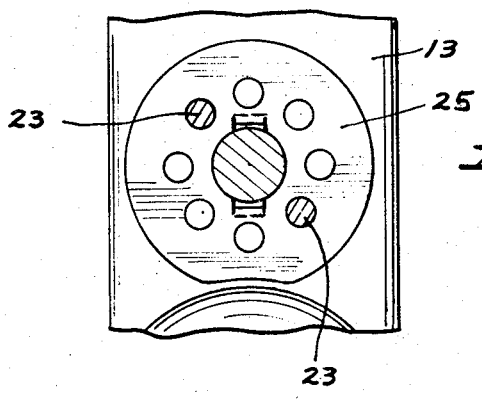
FIG. 8 is a sectional view taken as on line 8—8 in FIG. 2.

The housing 21, which forms a first portion of the nut asembly, is provided with detent means to insure that the inner housing 21 will not rattle loose during use, and also to insure that the force necessary to turn the housing with respect to the bolt will always be greater than that required to turn the outer grip portion of the nut assembly with respect to the inner housing. The detent means as shown comprises a pair of detent balls 23, that are spring loaded with suitable springs 24, and held in the openings in the housing 21. The balls 22 then are positioned to align with a plurality of detent pockets or openings in a washer 25. The washer 25 forms a detent seat, and means for keeping the washer 25 from rotating with respect to the frame portion 13 are provided. As shown in FIG. 8, these means can be small tabs that are bent down and extend into provided recesses or slots in the frame portion 13 so that the washer 25 does not rotate with respect to the frame. The springs 24 on the detent balls 23 then insure that housing 21 will not rotate unless the housing 21 is coupled to the outer portions of the nut assembly 20 and the nut is intentionally rotated.

Figure 7:
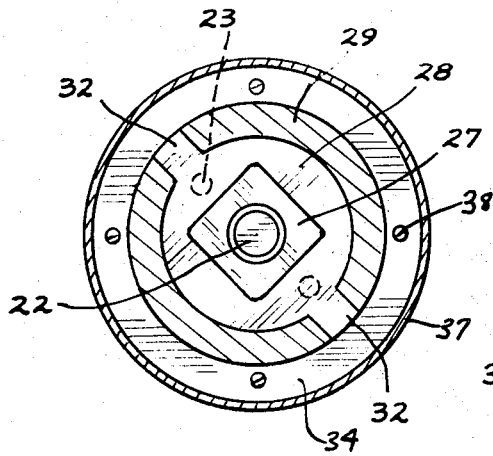
FIG. 7 is a sectional view taken as on line 7—7 in FIG. 2.
Figure 9:
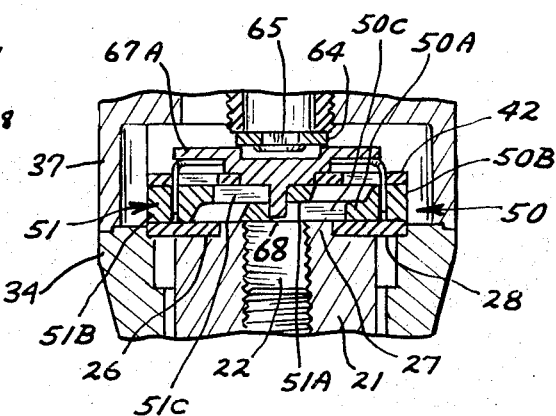
FIG. 9 is a sectional view taken as on line 9—9 in FIG. 4.

The upper portion of the housing 21, as perhaps shown best in FIGS. 7 and 9, has a shoulder portion 26 defined thereon, and a short, square shank 27 extends above the shoulder. The shank 27 receives and drivably supports a lower washer 28 of a pair of overlying drive washers. The lower washer 28 has an upstanding annular rim 29, surrounding a center planar member and there are a pair of oppositely disposed radially extending slots 32 defined in the rim 29. The slots 32 are used for driving purposes as will be apparent as the description proceeds.

The outer nut handgrip portion 33 forms a complete housing or shield surrounding the inner housing 21, and is made up in two sections. The first section 34 is a tubular housing that surrounds the housing 21, and actually locks on the housing through the use of an inwardly extending flange 35 that interlocks underneath an outwardly extending flange 36 on the housing 21.

Figure 2:
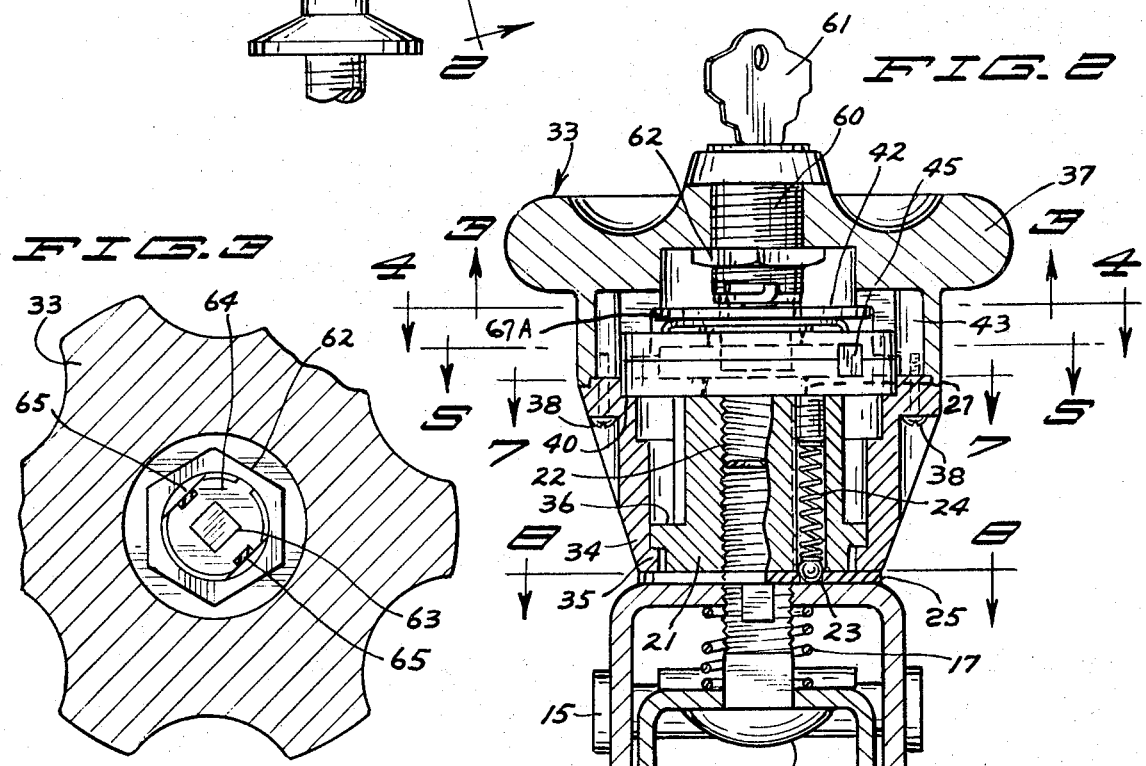
FIG. 2 is a sectional view taken as on line 2—2 in FIG. 1.

The second or upper section 37 of the handgrip 33 is fastened to the lower section 34 with suitable screws 38, as shown in FIG. 2. The screw head can be sealed with a resin or other material to make them tamper-proof.

It should be noted that the lower section 34 also forms a support shoulder 40 on which the washer 28 rests. The shoulders 35 and 36 form a lock which prevents pulling the outer housing 34 upwardly when the nut is attached to a bolt 16, but permits rotational movement between the two parts.

The upper section 37 of grip 33 has an interior chamber, holding an operating latch mechanism which will permit disengagement between the outer grip 33 and the inner housing 21. The outer grip, which has handgrip members thereon can be released from the housing 21 so that the grip will spin free with respect to the inner housing 21. A drive washer 42, which is a mate for washer 28, is inverted and rests on top of the washer 28. This drive washer 42 is drivably engaged with suitable ribs 43 which extend inwardly from the edges of the chamber in the upper section 37 of grip 33, so that washer 42 is drivably mounted with the upper section 37 and will rotate therewith. The members 43 extend from the housings in which the screws 38 are mounted.

The washer 42 has an outer annular peripheral rim 41 that is downwardly depending from the planar center portion of the washer 42 and this rim aligns with the rim 29 and rest thereof. The rim 41 of washer 42 has a pair of diametrically opposed radially extending slots 45 defined therethrough, which are the same size as the slots 32 in the washer 28.

When the washers 28 and 42 are mounted together, as shown in FIG. 2, the rims rest on each other and an interior chamber is defined by the rim 29 and the aligning rim 41 of the washer 42. It can be seen that these two washers will be permitted to slide relative to each other because washer 42 is driven only by the outer grip 33 of the nut, and the washer 28 is drivably connected through the square shank portion 27 to the inner housing 21. The drive lugs 43 for upper washer 42 clear the lower washer 28, so that there isn't any driving connection to washer 28 with these lugs.

Figure 4:
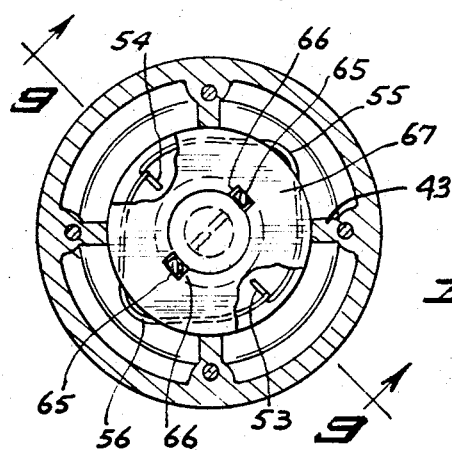
FIG. 4 is a sectional view taken as on line and in the direction of arrows 4—4 in FIG. 2.

The washers, however, are made so that they can be selectively drivably connected together, and this is how the driving connection between the outer grip portion of the nut and the inner housing 21 is effected. The driving connection is made with a pair of dogs mounted inside the flange 29 and the corresponding flange 41 of washer 42. The drive dogs are shown in FIG. 9 in section, and are numbered 50 and 51 respectively. The drive dogs are identically made, and each has a relatively flat portion 50A and 51A, respectively, and an outer end lug 50B and 51B, respectively. The flat portions 50A and 51A are also provided with center openings 50C and 51C, respectively which form cam openings for operating the dogs. Further, a pair of hair pin springs are mounted above the washer 42 and have legs that extend downwardly through provided slots 53 and 54 in the washer 42 (see FIG. 4). These springs, 55 and 56, respectively, then urge the dogs 50 and 51, respectively, radially outwardly from the center openings in the washers 28 and 42.

Figure 5:
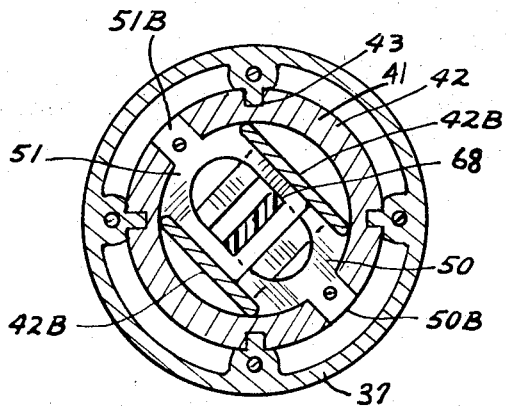
FIG. 5 is a sectional view taken as on line 5—5 in FIG. 2.

The dogs 50 and 51 are movable from a first position shown in FIG. 5 wherein the end lugs 51 B and 50B pass through the provided slots 32 and 45 (note that the lugs are double height so that each one will engage the aligning slots 32 and 45 simultaneously) and therefore these lugs 50B and 51B effect a driving connection between the washer 42 and the washer 28. This then gives the driving connection between the outer grip 33 of the nut and the inner housing 21.

Figure 6:
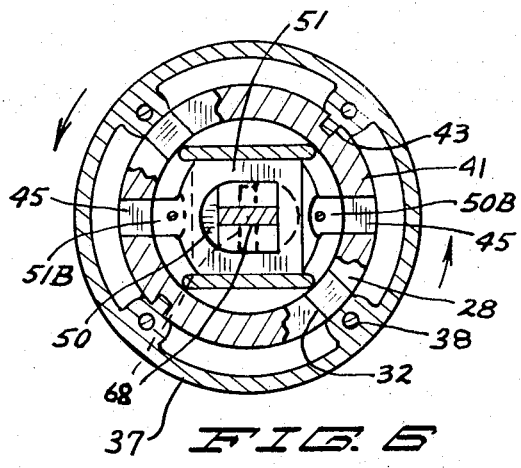
FIG. 6 is a sectional view taken as on the same sight line as FIG. 5 showing a locking member in a second position.

When the lugs are moved radially inwardly to their position as shown in FIG. 6, they merely ride inside the rim 29 and the corresponding rim 41 of washer 42, and can be held in this position so that there won't be any engagement between the lugs and the surfaces defining the slots. This means that when the dogs 50 and 51 are held inwardly in this position, the driving connection will be removed between the two washers, and the outer grip 37 of the nut will spin free, and the inner housing 21 cannot be tightened or loosened on bolt 16.

The control over the position of the dogs 50 and 51 is operated with a key lock assembly illustrated generally at 60. Key lock assembly 60 is of an ordinary tumbler type and operated with a key 61 that can be inserted from the exterior of the nut.

Figure 3:
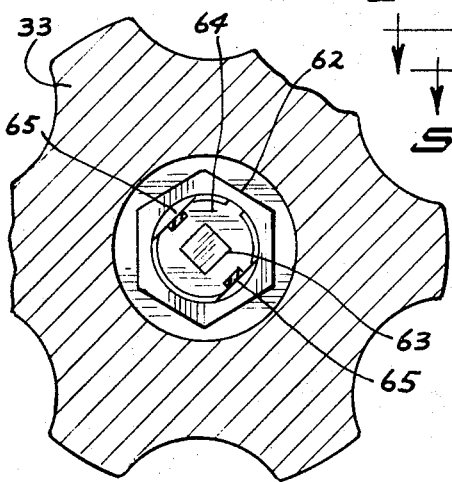
FIG. 3 is a sectional view taken along line 3—3 and in the directions of the arrows thereof in FIG. 2.

The key lock assembly is held in place with a suitable nut 62, and has an inner operating tang indicated in FIG. 3 at 63. This inner tang 63 is on ordinary keylock assemblies, and when the key 61 is operated it will turn the tang 63 with respect to the outer housing of the key lock assembly 60. The tang in turn drives a washer 64 that is positioned just below the outer housing of the key lock assembly, and this washer 64 has a pair of downwardly depending lugs 65 on opposite sides thereof. These lugs 65 in turn pass into openings 66 (see FIG. 4) of a lock operator washer indicated at 67. The operator washer 67 has a large outer flange 67A, and the outer flange 67A holds the springs 55 and 56 in place. The springs 55 and 56 are thus positioned between the flange 67A and the top of the washer 42.

The key operator washer 67 includes a shoulder portion that rides against the top surface of the washer 42 as shown in FIG. 9, and a downwardly extending cam operator 68 that extends through a provided opening in the center portions of the washer 42 and passes through the openings 51C and 50C of the dogs 50 and 51, respectively. It can be seen that this operator cam 68 extends into both of these openings simultaneously, and the end bars on each of the dog members 50 and 51 operates as a camming surface.

When the key is in a first position shown in FIG. 5, the cam member 68 is transverse to the openings, and the springs 55 and 56 are permitted to urge the dogs radially outwardly because the cam member 68 is not acting upon the cross bars at the ends of the openings in these dog members. However, when the cam 68 is moved to position as shown in FIG. 6, the cam edge surfaces act against the end bars at the end of the openings in these dog members and pull both of the dog members radially inwardly until the outer end of lugs 50B and 51B clear the inner surface of the annular rim 29 and the annular rim 41 on washer 42. This is when there is no driving connection between the outer grip 37 section and housing 21.

It should be noted that the dog members 50 and 51 are guided between a pair of parallel walls 42B, which are integral with and extend downwardly from the upper planar center wall of the washer 42, and provide guide means for the dogs as they are moved back and forth radially from a locked position of FIG. 6 to the unlocked position of FIG. 5 through the operation of the key and its associated cam member 68.

When the unit is turned to its position as shown in FIG. 6, the lugs are held clear of the slots in both of the rims of washers 28 and 42. The key can still be operated so that the cam member 68 will rotate to its 90° position shown in dotted lines in FIG. 6. The outer surfaces of the lugs 50B and 51B will continue to ride against the inner surfaces of the peripheral rim members 29 and 41 under the pressure of the springs 55 and 56, until such time as they align with the slots 32 and 45. Then the lugs will merely spring into place, and a driving connection will be effected. This means that there is no critical alignment necessary for unlocking the unit. The outer grip portion 37 of the nut can be in any position when the key 61 is operated and then merely rotated in order to get the driving connection.

Once the driving connection has been made between the washers by operating the key and cam 68, the inner housing 21 may be turned from grip 33 through the lugs 50B and 51B, and the washer 28, which drives through the square shank 27 to the housing 21. This means that the detent force from the detent balls 23, which are shown for illustrative purposes as the detent means, will be overcome and the bolt 16 can be loosened. However, when the key 61 is operated to actuate the inner member of the key lock, washer 64 and the cam member 68 are turned to position as shown in FIG. 6 and hold the latch dogs away from their locked position, the outer grip 33 will merely spin freely and will not be able to drive the inner housing 21. The detent means comprising the ball 23 and washer 25 can be changed to other detent means, if desired.

What is claimed is:

1. An antitheft nut device for a trailer coupling having a bolt used in the coupling for a latching member, comprising a nut assembly for said bolt having first and second members, said first member of said nut assembly being threadably mounted on said bolt, said second member of said nut assembly being rotatably mounted with respect to said first member, key operable means engagable between said first and second members to selectively effect a driving connection between said first and second members, said key operable means being movable to position to disengage the driving connection between said first and second members wherein said second member is rotatable with respect to said first member, and detent means acting between said first member and said trailer coupling to prevent unwanted rotation of said first member relative to said bolt.

2. The combination as specified in claim 1 wherein said detent means acting between comprises a spring loaded member urged toward a receptacle defined in a surface normally held stationary with respect to said trailer coupling.

3. The combination as specified in claim 1 wherein said key operable means comprises a cam member actuated with said key, and at least one dog movable by said cam member, and first and second drive members connected to said first and second members, respectively, said dirve members being drivably coupled with said dog in a first position, and movable with respect to each other when said dog is in a second position.

4. The combination as specified in claim 3 wherein said drive members comprise a pair of washers each having a peripheral rim member defining a chamber in the center portions thereof and being mounted coaxially, radial slot means defined in each of said rim members, and said dog being movable radially by said cam member from a first cam member position where the dog is clearing said rim members to a second cam member position wherein the dog is released to move radially outward by said cam member, and spring means urging said dog radially outwardly to engage said slot means with the cam member in its second position.

5. The combination as specified in claim 4 wherein each rim member has two slot means therein and wherein there are a pair of dogs, said dogs each having a relatively flat portion and an enlarged end portion, and each enlarged end portion engaging a slot means in each washer simultaneously to effect the driving connection between said washers with the cam member in second position.

6. The combination as specified in claim 1 wherein said means includes detent spring loaded members drivably mounted with said first portion, and receptacles defined in a surface stationary with respect to said first portion and into which said spring loaded members resiliently fit.

7. The combination as specified in claim 6 wherein said second portion comprises two sections, a first tubular section surrounding said first portion and extending substantially to said coupler frame, and a second section having a plurality of handgrip receptacles defined in the periphery thereof.

8. The combination of claim 1 wherein said detent means acting between said first member and said trailer coupling comprises a washer member mounted over said bolt and positioned between said trailer coupling and said nut assembly, means cooperating between the washer member and trailer coupling to prevent rotation of said washer member relative to the trailer coupling.

9. A locking device for preventing thefts of trailers having trailer couplers including a main frame, a ball socket formed in said main frame, a locking lever to hold a ball in position in said socket and a control bolt for moving said locking lever, the improvement comprising a nut assembly for said control bolt having a first portion threadably mounted onto said bolt to tighten said locking lever, a second portion rotatably mounted with respect to said first portion, means to hold the second portion in position in axial direction on said first portion, interlocking drive means between said first and second portions, a lock member, removable key means to operate said lock member, said lock member being movable with said key means to release said interlocking drive means between said first and second portions to permit said second portion to rotate with respect to said first portion, and detent means acting between the first portion and the frame to restrain the first portion from rotation when the lock member is moved to release the interlocking drive means.

10. The combination as specified in claim 9 wherein said interlocking drive means comprises a pair of cup shaped washers having peripheral rims, each of said peripheral rims having a radially slot defined therein, and a cam operated dog having an end portion of size to extend between the rims of the said washers to effect a rotational driving connection between said rims, said dog being retractable within the periphery of the rim of at least one washer to permit relative movement between said washers.

11. The combination as specified in claim 10 and spring to urge said dog means radially outwardly toward said rims.

12. The combination as specified in claim 11 wherin said lock means includes a cam, said dog having cam follower means thereon actuated by said cam to be moved radially inwardly to disengage the drive means with the lock means in a locked position.

13. An antitheft trailer coupling nut device for a trailer coupling having a bolt which is tightenable to actuate a coupling member, comprising a nut assembly for said bolt having two nut members, a first nut member of said nut assembly having means to threadably mount on said bolt, a second nut member of said nut assembly rotatably mounted with respect to said first nut member, key lock operable means engagable between said first and second nut members to selectively effect a driving connection between said first and second nut members, said key lock operable means being movable to position to disengage the driving connection between said first and second nut members whereby said second nut member turns freely with respect to said first nut member, and interlocking flange means between the first and second nut members to prevent the second nut member from moving in direction away from said coupler with respect to said first nut member.

14. An antitheft nut device for a bolt utilized as a locking member and passing through a wall member with respect to which the bolt is restrained from rotation when locked, comprising a nut assembly for said bolt, said nut assembly including a first nut member adapted to be threadably mounted on said bolt, and a second nut member rotatably mounted with respect to said first nut member, operable means engagable between said first and second nut members to selectively effect a rotational drive connection between said first and second nut members, and to disengage the rotational drive connection between said first and second nut members whereby said second member is rotatable with respect to said first member, a washer positioned over said bolt between the wall member and said nut assembly and having means engaging the wall member to prevent the washer from rotating with respect to the wall member, and interlocking means acting between said first nut member and said washer to restrain said first nut member from rotation when the first nut member is tightened on said bolt and said operable means is in position to disengage the rotational drive connection between said first and second nut members.

15. The nut device of claim 14 wherein said means engaging said wall member comprises depending tab means on said washer and slot means on said wall member of size to receive said tab means.

16. The nut device of claim 15 wherein said washer member has at least one opening, facing said first nut member, and said detent means comprises means carried by said nut member positioned to engage and enter the opening in said washer in at least one rotational position of the nut assembly when said drive connection is disengaged.

* * * * *

PO-1050
(5/69)

UNITED STATES PATENT OFFICE
CERTIFICATE OF CORRECTION

Patent No. 3,770,299      Dated November 6, 1973

Inventor(s) Vincent H. Murphy

It is certified that error appears in the above-identified patent and that said Letters Patent are hereby corrected as shown below:

Column 6, line 31, (Claim 3, line 6), "dirve" should be --drive--; Column 6, line 56, (Claim 6, line 2), take out "detent" after the word --includes-- and insert "detent" before the word --means--. Column 7, line 37, (Claim 11, line 2), after "spring" insert --means--; after "dog" take out --means--.

Signed and sealed this 30th day of April 1974.

(SEAL)
Attest:

EDWARD M. FLETCHER, JR.
Attesting Officer

C. MARSHALL DANN
Commissioner of Patent